United States Patent [19]

Hashimoto

[11] Patent Number: 5,029,197

[45] Date of Patent: Jul. 2, 1991

[54] AUTOMATIC DIALING AND RESPONDING DEVICE

[75] Inventor: Kazuo Hashimoto, Tokyo, Japan

[73] Assignee: Hashimoto Corporation, Tokyo, Japan

[21] Appl. No.: 422,794

[22] Filed: Oct. 18, 1989

[30] Foreign Application Priority Data

Oct. 20, 1988 [JP] Japan ................... 63-264930

[51] Int. Cl.⁵ ......................... H04M 1/27; H04M 1/64
[52] U.S. Cl. ........................................ 379/67; 379/88;
379/257; 379/355
[58] Field of Search ................... 379/216, 355, 67, 88,
379/257, 386

[56] References Cited

U.S. PATENT DOCUMENTS 4,513,175  4/1985  Smith ................................. 379/355
4,805,212  2/1989  Hase et al. ......................... 379/359

FOREIGN PATENT DOCUMENTS 0229953  9/1988  Japan ................................. 379/355
1524028  9/1978  United Kingdom .
2198613A  6/1988  United Kingdom .

Primary Examiner—Thomas W. Brown
Attorney, Agent, or Firm—Lowe, Price, LeBlanc and Becker

[57] ABSTRACT

An automatic dialing and responding device, wherein it is possible for a user to make an international call through a toll telephone exchange office easily and surely by automating the whole operation until a desired called party answers the call. The specific number for calling the office and the telephone numbers of the user and the called party are previously stored in the device for the automatic dialing, so that the calling of the office, the response to the office's instructions and the calling of the desired called party can be automatically carried out. It is also possible to select one of called parties' telephone numbers previously stored.

4 Claims, 3 Drawing Sheets

AUTOMATIC DIALING AND RESPONDING DEVICE

BACKGROUND OF THE INVENTION

The present invention relates to an automatic dialing and responding device for making an international telephone call through a telephone exchange office.

Conventionally, in the case of an international telephone through a toll telephone exchange office of some area, the tones of a push-button telephone) are sent from a calling party during the conversation with the office in accordance with the instruction of the office.

SUMMARY OF THE INVENTION

It is an object of the present invention to provide an automatic dialing and responding device wherein it is possible to make an international telephone call through a toll telephone exchange office by a series of sequence means stored and registered with all responses to the office and instructions from the office based on the responses, so that the inconvenience of the international telephone call may be eliminated by automating all operations from the first call of the telephone office to the response to the called party.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2-1 and 2-2 show the examples of the display.

DESCRIPTION OF THE PREFERRED EMBODIMENT

An embodiment of the present invention will be described in the following in connection with its structure and operations.

The descriptions will be made at first with reference the circuit diagram of FIG. 1 and the flow charts of FIGS. 2 and 3.

Figure 1:
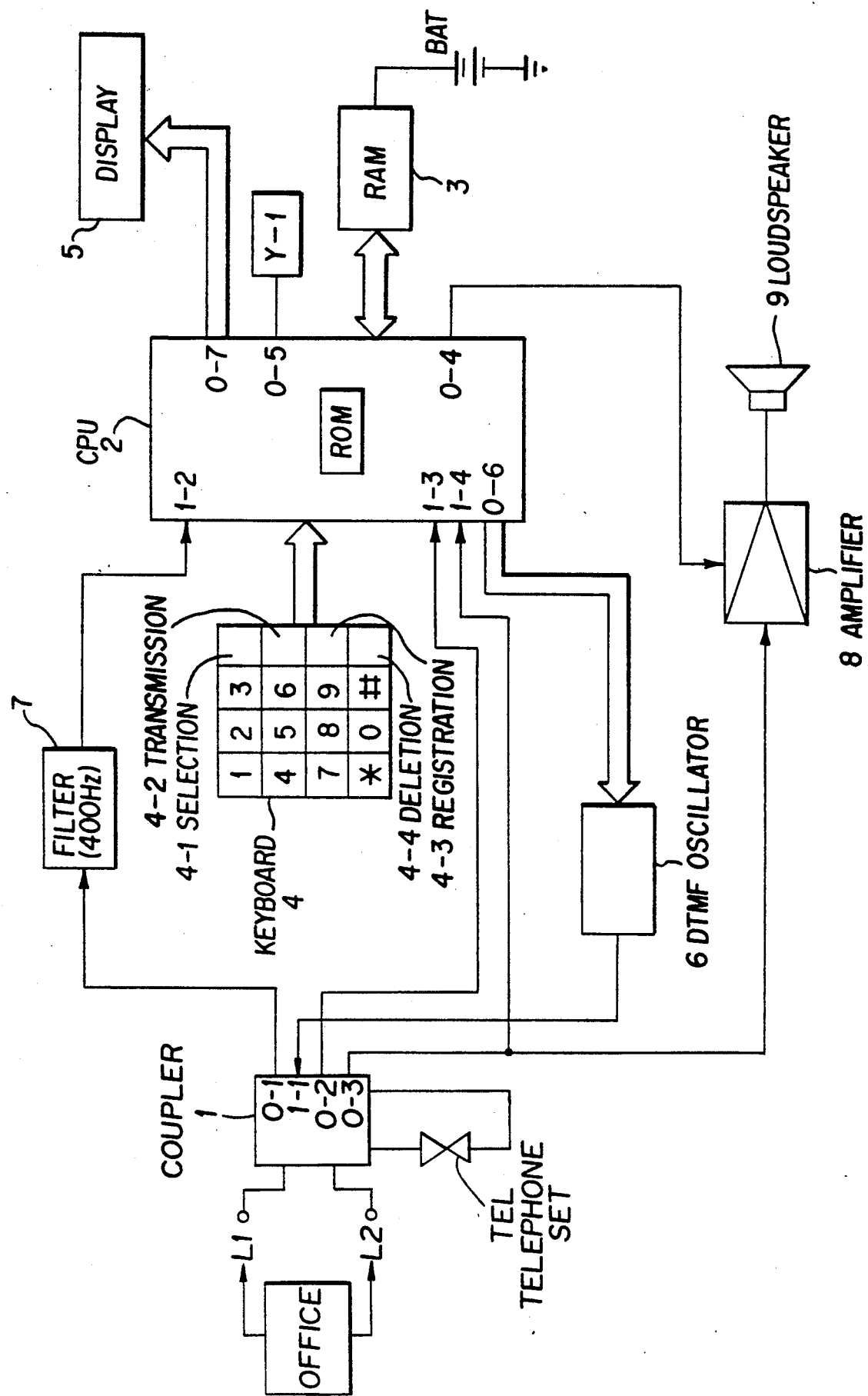
FIG. 1 is a block diagram showing the embodiment of the present invention.
Figure 2:
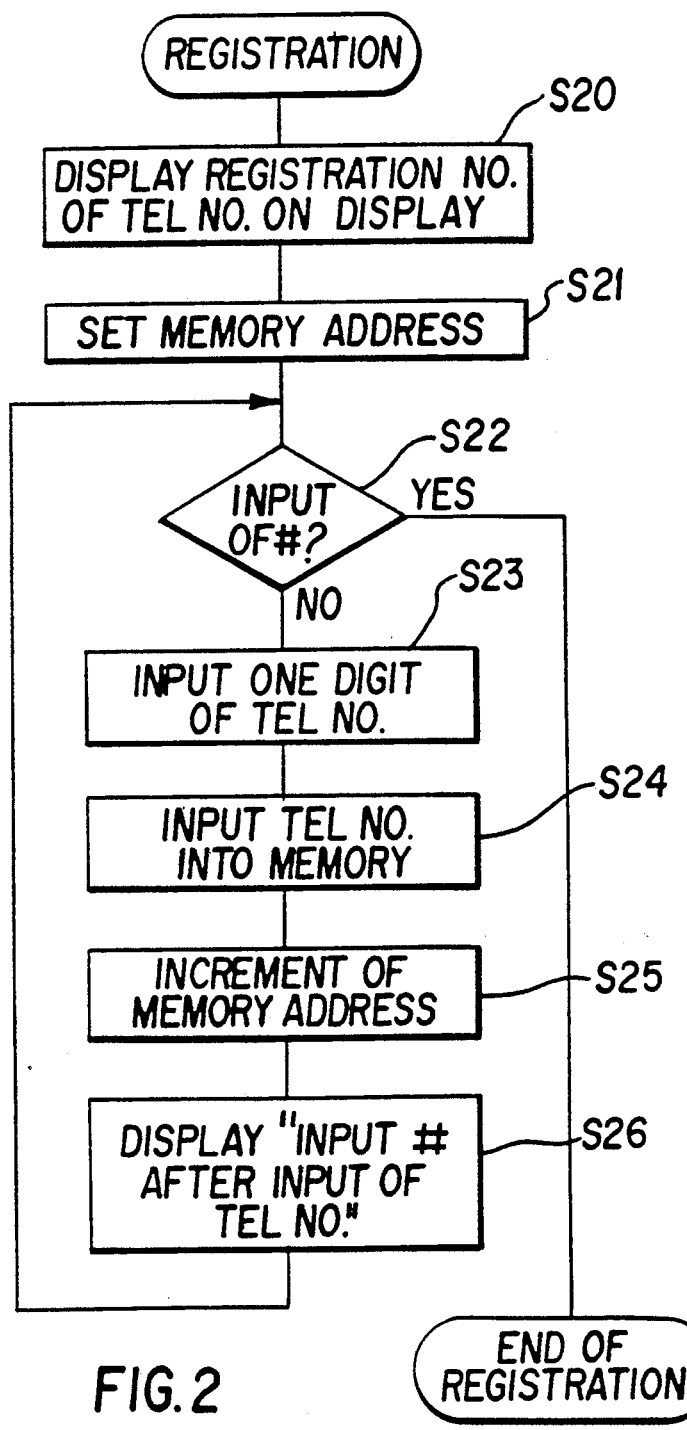
FIG. 2 is a flow chart at the time of registration of the telephone number.

In FIG. 1: reference characters L1 and L2 designate telephone lines; letters TEL designate a telephone set; numeral 1 designates a coupler composed of a line transformer for coupling the aforementioned telephone lines and the present device; and numeral 2 designates a 1-chip microprocessor (CPU) which has a ROM (i.e., Read Only Memory) stored with a program. Moreover, numeral 3 designates a RAM (i.e., Random Access Memory) which is stored with a plurality of telephone numbers and backed up by a battery BAT FOR coping with a service interruption. Numeral 4 designates a key board which is composed of ten keys for manual dial operations, a selection key 4-1 for selecting one of the plural telephone numbers stored in the RAM 3, a transmission key 4-2 for automatic dialing in a predetermined order on the basis of the telephone number selected by the selection key, a registration key 4-3 for registering the telephone number in the RAM 3, and a deletion key 404 for deleting the unnecessary one of the telephone numbers registered in the RAM 3. Numeral 5 designates a display for displaying a telephone number when selected or registered. Numeral 6 designates a DTMF oscillator for outputting multifrequency tones when the aforementioned ten keys are depressed, and numeral 7 designates a filter of 400 Hz for detecting the dial tones of 400 Hz and interrupted signals sent from the office. Numeral 8 designates an amplifier which is associated with a loudspeaker 9 for monitoring the answer of a called party while he is being called.

Next, means for registering the telephone numbers in the RAM 3 of FIG. 1 will be described in the following with reference to FIGS. 1 and 2. First of all, if the registration key 4-3 is depressed, the program stored in the ROM of the CPU 2 calls a subroutine shown in FIG. 2. At Step S20, the telephone numbers stored in the RAM 3 are searched to display the registration number to be newly registered, on the display 5, as shown in FIG. 2-1. In the present embodiment, the registration number "0:" is recorded with the telephone number of the owner of the present device; and the registration number "1:" is recorded with a specific number such as "0059" for calling the office. If, moreover, the registration number "2:" is already registered with a telephone number, the registration number "3:" to be newly registered is displayed, as shown in FIG. 2-1. At the same time, the instruction of "input the telephone number" instructing the manner of operations is displayed. At Step S21, the leading address of the memory for the registration number "3:" is set. At subsequent Step S22, it is tested whether or not the mark "#" to be used as a punctuation signal for the telephone number to be inputted after the end of the input of a series of telephone number has been inputted. The Step S22 is NO until the input of a series of telephone number is ended, the subroutine advances to Step S23, at which one digit of the telephone number is inputted by using the keyboard 4 of FIG. 1. This telephone number is stored in a predetermined position of the memory RAM 3 (Step 24), and the address of the memory RAM 3 is incremented by +1 for a next digit of the telephone number. At subsequent Step S26, the instruction "Please input the mark "#" after the input of the telephone number" is displayed, as shown in FIG. 2-2. Since the subroutine from the Step 26 to the Step S22 is looped, the subroutine of FIG. 2 is ended if the input of a series of telephone number is ended and if the mark "#" is inputted. Alternatively, a speed dial number may be registered in place of that telephone number.

Next, the automatic dialing operations by the telephone number thus registered will be specifically described with reference to the flow chart of FIG. 3.

For these automatic dialing operations, it is necessary that the telephone number of the owner of the present device and the specific number for calling the office, e.g., the number "0059" and at least one telephone number of the called party be registered in the memory RAM 3, as has been described hereinbefore. In case, moreover, a plurality of called parties' telephone numbers are registered, the telephone number of the corresponding called party should be selected by using the selection key 4-1 of FIG. 1. Since this means is well known in the art, its flow chart is omitted.

Figure 3:
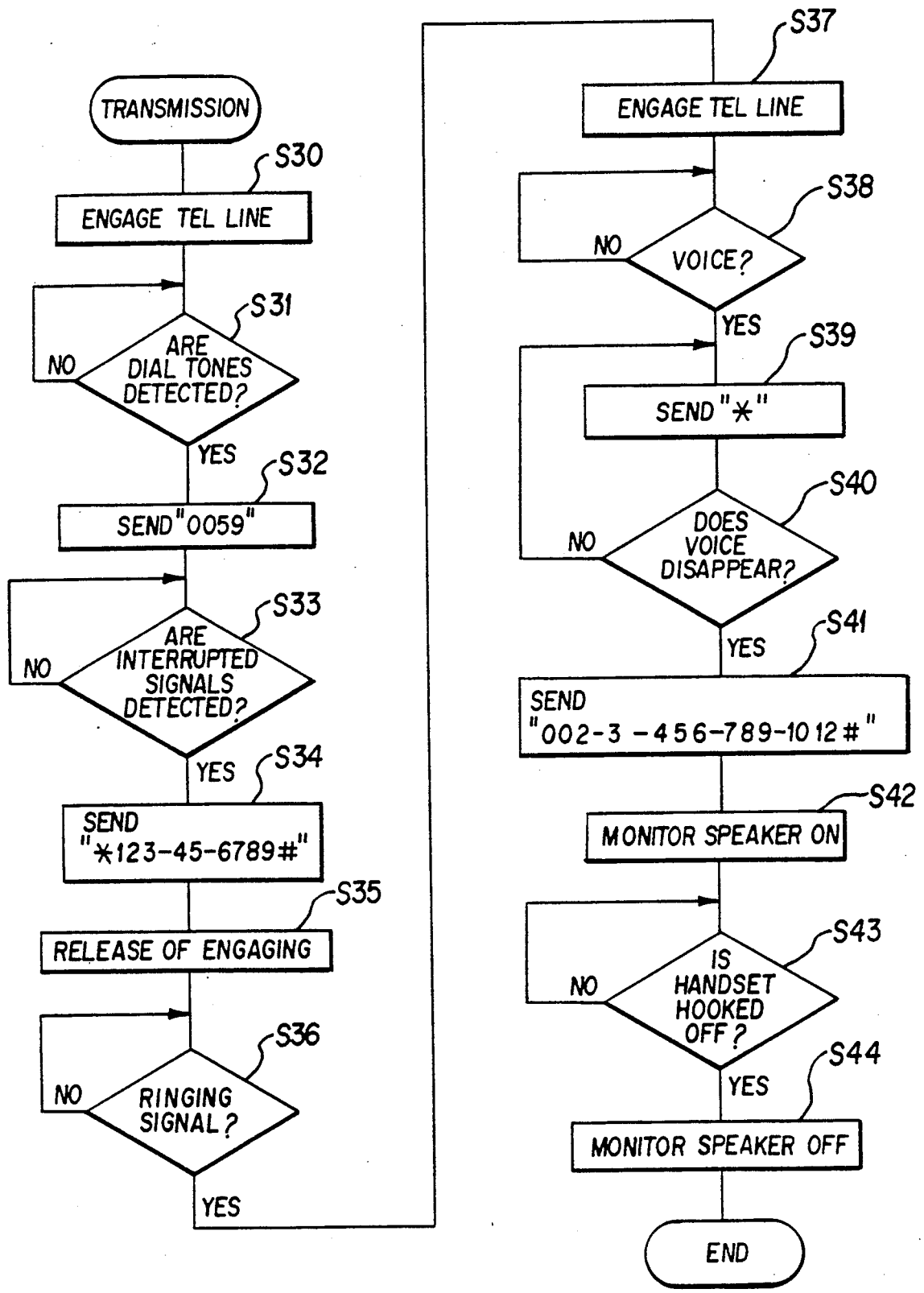
FIG. 3 is a flow chart at the time of automatic dialing.

Now, if the transmission key 4-2 of FIG. 1 is depressed, a subroutine shown in FIG. 3 is called. At Step 30, a relay Y-1 connected with an output port 0-5 of the CPU 2 is retained ON to engage the telephone lines L1 and L2 through the contact (although not shown) of the relay Y-1 in the coupler 1. At this time, dial tones are sent from the office to the present device and are tested at Step S31. If these dial tones are detected through the filter 7, the subroutine advances to Step S32, at which the specific number "0059" is transmitted to the telephone lines L1 and L2 through an output port 0-3 of the CPU 2, the DTMF oscillator 6 and the coupler 1. If the office recognizes that specific number, it sends interrupted signals of 400 Hz to the present device and these signals are detected (at Step S33) with the program through the filter 7. If these interrupted signals are detected, the subroutine advances to Step S34, at which the telephone number of the owner of the present device with addition of "*" and "#" are transmitted. If this transmission is ended, the engaging of the telephone lines is once released (at Step S35).

Subsequently, the present device stands by for the call from the office. When the office is prepared, the present device is called back by the telephone number of the device registered at the side of the office, as has been described above. Therefore, the ringing signals are tested at Step S36. These ringing signals are introduced from the output terminal 0-3 of the coupler 1 of FIG. 1 to the input port I-4 of the CPU 2 so that they are detected by the program. When these ringing signals are detected, the telephone lines are engaged (at Step S37) like the aforementioned Step S30.

Subsequently, the voice "Please dial the telephone number of the called party." is sent by a voice synthesizer from the office. The office receives the telephone number during or after the sending of the synthesizer. If the voice of the synthesizer is detected (it is simply detected in the present embodiment whether or not the signal exists, but the word "dial" could be detected by the voice recognition), the subroutine advances at Step S39, at which the mark "*" is first sent out like the aforementioned registration. If this mark "*" is received during the sending by the voice synthesizer at the office, this synthesizer is interrupted. This interruption is tested at Step S40. If the speech of the synthesizer is interrupted, the subroutine advances to Step S41, at which the telephone number for calling the selected called party is automatically dialed with the addition of the mark "#" at the last. Then, the subroutine advances to Step S42, at which the amplifier 8 can be activated in response to the signal coming from the output port 0-4 of the CPU 2 to confirm the answer of the called party by using the loudspeaker 9. Specifically, the ringback tones calling the called party are heard at first from the loudspeaker 9. If the called party answers, his voice "hello" is heard. If the telephone set TEL is then hooked off, this off-hook is detected through the output of the output port 0-2 of the coupler 1 to restore the relay Y-1 so that the telephone lines can be engaged by the telephone set TEL only to make the mutual conversation possible through the telephone set while turning off the monitor from the loudspeaker 9 (at Steps S43 and S44).

Incidentally, the present device can be equipped with a switch for switching the aforementioned special automatic dial to the commercially available automatic dial of normal type.

As has been described hereinbefore, the present device eliminates the inconvenience which is encountered by a calling party, in case he is going to call abroad from an area other than large cities, namely, the disadvantage that the call of the other party is stepwise accomplished according to the instruction of the local office, and allows the calling party to call the other party automatically. Thus, the present device provides the practical effect that the operations can be reliable with no fear of intermediate failure.

Although a certain preferred embodiment has been shown and described, it should be understood that many changes and modifications may be made therein without departing from the scope of the invention.

I claim:

1. A method of automatic dialing to engage telephonic communication between a local calling party and a distant party in cooperation with a remote office, wherein telephone apparatus of the calling party includes the capacity to store a plurality of telephone numbers, comprising the steps of engaging telephone lines at a local telephone site;
detecting dial tones sent from an office;
automatically dialing a specific number for calling the office in response to detection of a dial tone;
detecting specific signal tones sent from the office in response to an automatically dialed call;
automatically dialing and transmitting to the office the telephone number of the calling party in response to detection of said specific signal tones;
releasing the engagement of the telephone lines after dialing the telephone number of the calling party;
re-engaging the telephone lines in response to subsequent detection of a call form the office;
detecting a message sent from the office after re-engagement of the telephone lines;
automatically dialing a previously stored telephone number of a called party in response to the detection of said message; and
generating discernable ring-back tones of the called party
whereby said ring-back tones can be monitored and conversation can be started between the calling party and the called party after said called party has responded.

2. A method of automatic dialing to engage telephonic communication between a local calling party and a distant party in cooperation with a remote office, wherein telephone apparatus of the calling party includes the capacity to store a plurality of telephone numbers, comprising the steps of engaging telephone lines at a local telephone site;
detecting dial tones sent from an office;
automatically dialing a specific number for calling the office in response to detection of a dial tone;
detecting specific signal tones sent from the office in response to an automatically dialed call;
releasing the engagement of the telephone lines after detection of said specific signal tones;
re-engaging the telephone lines in response to subsequent detection of a call form the office;
automatically dialing a previously stored telephone number of a called party in response to the detection of a message sent from the office after re-engagement of the telephone lines; and
monitoring ring-back tones of the called party whereby conversation can be started between the calling party and the called party after said called party has responded.

3. An automatic dialing and responding device, comprising:

engaging means for a) engaging telephone lines and b) releasing the engagement of the telephone lines after automatic dialing;

detection means for a) detecting dial tones sent form a remote office and b) detecting specific signal tones sent from the office in response to automatic dialing;

automatic dialing means for a) dialing a specific number for calling said office automatically in response to detection of a dial tone, b) automatically dialing and transmitting to the office the telephone number of the calling party in response to detection of specific signal tones received from said office, and c) automatically dialing a telephone number of a called party, previously stored, in response to detection of a message sent from the office after release of engagement and re-engagement of the telephone lines by said engaging means; and means for generating discernable ring-back tones of the called party after the dialing by said automatic dialing means;

whereby said ring-back tones can be monitored and conversation can be started between the calling party and the called party after said called party has responded.

4. An automatic dialing and responding device according to claim 3, further comprising means for storing a plurality of telephone numbers and selection means for selecting one of said plurality of telephone numbers stored to be automatically dialed by said automatic dialing means.

* * * * *